United States Patent
Fan et al.

(10) Patent No.: US 12,516,452 B2
(45) Date of Patent: Jan. 6, 2026

(54) COMPOSITE INTERLACED YARN, INTERLACING METHOD AND APPLICATION THEREFOR

(71) Applicant: JIANGSU HENGLI CHEMICAL FIBRE CO., LTD., Suzhou (CN)

(72) Inventors: Hongwei Fan, Suzhou (CN); Fangming Tang, Suzhou (CN); Lixin Yin, Suzhou (CN); Lili Wang, Suzhou (CN); Huailin Ren, Suzhou (CN); Xue Wang, Suzhou (CN); Yuanhua Zhang, Suzhou (CN); Xixia Zhang, Suzhou (CN); Cunhong Wei, Suzhou (CN)

(73) Assignee: JIANGSU HENGLI CHEMICAL FIBRE CO., LTD., Suzhou (CN)

( * ) Notice: Subject to any disclaimer, the term of this patent is extended or adjusted under 35 U.S.C. 154(b) by 0 days.

(21) Appl. No.: 18/725,136

(22) PCT Filed: Nov. 2, 2022

(86) PCT No.: PCT/CN2022/129202
§ 371 (c)(1),
(2) Date: Jun. 28, 2024

(87) PCT Pub. No.: WO2023/124513
PCT Pub. Date: Jul. 6, 2023

(65) Prior Publication Data
US 2025/0163614 A1 May 22, 2025

(30) Foreign Application Priority Data
Dec. 30, 2021 (CN) .......................... 202111655660.X

(51) Int. Cl.
*D02G 3/22* (2006.01)
*D02G 1/00* (2006.01)
(Continued)

(52) U.S. Cl.
CPC .............. *D02G 3/22* (2013.01); *D02G 1/008* (2013.01); *D02J 1/08* (2013.01); *D03D 15/49* (2021.01)

(58) Field of Classification Search
None
See application file for complete search history.

(56) References Cited

U.S. PATENT DOCUMENTS

| | | | |
|---|---|---|---|
| 3,673,648 A | 7/1972 | Thacker, Jr. | |
| 3,865,678 A * | 2/1975 | Okamoto | D03D 15/283 28/162 |
| 2021/0348308 A1* | 11/2021 | Kestner | D02J 1/08 |

FOREIGN PATENT DOCUMENTS

| CN | 87207324 U | 5/1988 |
|---|---|---|
| CN | 2237053 Y | 10/1996 |

(Continued)

OTHER PUBLICATIONS

Machine Translation of JPH111837 (Year: 1999).*
(Continued)

*Primary Examiner* — Shawn Mckinnon
(74) *Attorney, Agent, or Firm* — Bayramoglu Law Offices LLC

(57) ABSTRACT

A composite interlaced yarn is a filament subjected to an interlacing process, wherein the filament is a multifilament, and the composite interlaced yarn includes a plurality of continuous circulation units in a longitudinal length; each circulation unit includes a splitting part I, an interlacing part I, a splitting part II and an interlacing part II connected in sequence; an interlacing fastness of the interlacing part I is different from an interlacing fastness of the interlacing part II. An interlacing method for the composite interlaced yarn includes: the multifilament that is not subjected to the interlacing process sequentially adjusting a pre-tension by a tensioner, passing through a yarn path of a jet, and winding
(Continued)

by a winding roller, so as to obtain the composite interlaced yarn, wherein a jet hole I and a jet hole II are formed in the jet.

5 Claims, 2 Drawing Sheets

(51) Int. Cl.
*D02J 1/08* (2006.01)
*D03D 15/49* (2021.01)

(56) References Cited

FOREIGN PATENT DOCUMENTS

| | | | |
|---|---|---|---|
| CN | 102443909 | A | 5/2012 |
| CN | 107574524 | A | 1/2018 |
| CN | 114318617 | A | 4/2022 |
| JP | H07138833 | A | 5/1995 |
| JP | H111837 | * | 1/1999 |
| JP | H111837 | A | 1/1999 |
| JP | 2000160446 | A | 6/2000 |

OTHER PUBLICATIONS

FZ/T 50001-2005, Testing Method For Interlacing Degree of Synthetic Filament Yarns, National Development and Reform Commission, 2005, pp. 1-10.

* cited by examiner

COMPOSITE INTERLACED YARN, INTERLACING METHOD AND APPLICATION THEREFOR

CROSS REFERENCE TO THE RELATED APPLICATIONS

This application is the national phase entry of International Application No. PCT/CN2022/129202, filed on Nov. 2, 2022, which is based upon and claims priority to Chinese Patent Application No. 202111655660.X, filed on Dec. 30, 2021, the entire contents of which are incorporated herein by reference.

TECHNICAL FIELD

The present invention belongs to the technical field of spinning, and more particularly, relates to a composite interlaced yarn, an interlacing method and application therefor.

BACKGROUND

The interlacing technology is widely used and highly mature technology in chemical fiber production, with strong practicality and large development space. The interlacing processing is an effective technology to improve the cohesion of chemical fiber filaments, such as in the draw texturing yarn (DTY) production, the interlacing processing can make the filaments achieve the purpose of untwisted and sizing-free, which not only greatly shortens the process, but also can obtain excellent spinning feeling. In the interlacing jet, the filaments are entangled with each other under the action of compressed airflow to form the splitting part and the interlacing part. At this stage, the research on the interlacing processing of filaments mainly focuses on the interlacing processing parameters, the size of entangling device and the interlacing processing principle. Low energy consumption, easy operation, good process flexibility and interlacing yarn quality are becoming the mainstream trend in the development of the interlacing technology, especially the current research on jet modularization. Combining interlacing process with oiling process is also one of the new ideas for current research. But so far, the interlacing function of the interlacing jet is relatively single, and the style of interlacing products has not changed much, which also limits the application scope of the interlacing technology.

SUMMARY

In order to overcome the deficiencies in the prior art, the present invention provides a composite interlaced yarn, an interlacing method and application therefor.

To this end, the technical schemes of the invention are as follows:

A composite interlaced yarn, is a filament subjected to an interlacing process, wherein the filament is a multifilament, wherein the composite interlaced yarn includes a plurality of continuous circulation units in a longitudinal length;
  wherein each circulation unit includes a splitting part I, an interlacing part I, a splitting part II and an interlacing part II connected in sequence;
  wherein an interlacing fastness of the interlacing part I is different from an interlacing fastness of the interlacing part II.

The principle of filament interlacing processing is that when the filament passes through the jet, it is impacted by the airflow from the jet, and the originally parallel monofilaments of the bundle are separated to form a symmetrical fluffy wave-like opening section, called the splitting part; the monofilaments that are not impacted by the airflow are interspersed and transferred with each other under the action of the vortex, forming a false twisted braid into an interlacing knot, called the interlacing part.

The degree of filament interlacing is usually measured by two indicators, one is the interlacing degree N, which refers to the number of interlacing knots per unit length (m); the other is the interlacing fastness S, which is defined as Nr/N, where Nr is the number of interlacing knots remaining in the unit length of the interlacing yarn after a load of 132 mN/tex for 3 minutes. See FZ/T 50001-2005 *"Testing Method For Interlacing Degree of Synthetic Filament Yarns"*.

The following preferred technology program is presented to give a detailed description for this invention:

The said composite interlaced yarn, wherein the interlacing fastness of the interlacing part I is 85-95%, and the interlacing fastness of the interlacing part II is 40-60%.

The said composite interlaced yarn, wherein an interlacing degree of the interlacing part I is 20-50, and an interlacing degree of the interlacing part II is 20-50.

Wherein the length of the interlacing part I is 7-15 mm, the length of the splitting part II is 3-10 mm, the length of the interlacing part II is 7-15 mm, and the length of the splitting part I is 3-10 mm.

The said composite interlaced yarn, wherein the filament is a fine denier DTY multifilament, and the specification of the fine denier DTY multifilament is 3-15 tex/10-40 F.

The present invention also provides the said method for interlacing the composite interlaced yarn: the multifilament that is not subjected to the interlacing process sequentially adjusting a pre-tension by a tensioner, passing through a yarn path of a jet, and winding by a winding roller, to obtain the composite interlaced yarn;
  wherein the jet is formed by processing a cubic structure (the material is generally metal), wherein the cube has surfaces a and a' parallel to each other, surfaces b and b' parallel to each other, and surfaces c and c' parallel to each other; wherein the processing is to open grooves w and v penetrating surfaces b and b' on surface c, open through-holes extending to surface a' on surface a, the through-hole passing through grooves w and v and serving as the yarn path of the jet, and open holes x and y connected to the through-hole on surface b or b', connection surfaces of holes x and y with the through-hole completely falling into a side wall of the through-holes, the hole x serving as the jet hole I of the jet, the hole y serving as the jet hole II of the jet, and the distance between a center point of the connection surface of the hole x with the through-hole and a center point of the connection surface of the hole y with the through-hole is 5-10 mm;
  when the multifilament passing through the yarn path of the jet, wherein the jet hole I and the jet hole II intermittently inject a compressed airflow into the yarn path (that is, in the yarn path, the multifilament is firstly subjected to the interlacing effect of the airflow injected by the jet hole I, and then to the interlacing effect of the airflow injected by the jet hole II), after the jet hole I finishes injecting airflow for a certain interval time T1, the jet hole II injects the airflow, and after the jet hole II finishes injecting airflow for a certain interval time T2, the jet hole I injects the airflow again; a time for a single airflow injection by the jet hole I and the jet hole II is the same, T1 and T2 are the same, a linear velocity of the winding roller is 30-50 m/s, and the pressure of injecting the compressed airflow into the yarn path by the jet hole I is greater than the pressure of injecting the compressed airflow into the yarn path by the jet hole II.

When the multifilament passes through the yarn path, the longitudinal center axis of the multifilament coincides with the longitudinal center axis of the yarn path.

The composite interlaced yarn and the interlacing method therefor in the invention, are formed by the interlacing process of two jet holes on a specially designed jet. The two jet holes are arranged at intervals, and the positions of the two jet holes are aligned with the central axis of the yarn path; since the pressure of injecting the compressed airflow by the jet hole I is greater than the pressure of injecting the compressed airflow by the jet hole II, the interlacing fastness of the interlacing knot formed by the jet hole I is greater than the interlacing fastness of the interlacing knot formed by the jet hole II, the jet hole I and the jet hole II inject airflow into the yarn path at intervals, but the frequency of the injected airflow is the same; by coordinating with the linear velocity of the winding roller, the composite interlaced yarn can change periodically and regularly in the length direction; the change rule in one cycle is a splitting part I, an interlacing part I, a splitting part II and an interlacing part II. Among them, the interlacing part I is formed by the interlacing process of the jet hole I, and the interlacing part II is formed by the interlacing process of the jet hole II, so that the interlacing fastness S of the interlacing part I is greater than the interlacing fastness of the interlacing part II.

The following preferred technology program is presented to give a detailed description for this invention:

The said method for interlacing the composite interlaced yarn, wherein the time for the single airflow injection by the jet hole I and the jet hole II is 0.1-0.2 ms, and T1 and T2 are both 0.225-0.3 ms.

The said method for interlacing the composite interlaced yarn, wherein a pressure of the compressed airflow injected into the jet hole I is 0.2-0.3 MPa, and a pressure of the compressed airflow injected into the jet hole II is 0.05-0.1 MPa.

The said method for interlacing the composite interlaced yarn, wherein the jet hole I and the jet hole II are located on the same side of the jet, central axes of the jet hole I and the jet hole II are both perpendicular to the central axis of the yarn path, and structures of the jet hole I and the jet hole II are the same.

The said method for interlacing the composite interlaced yarn, wherein the pre-tension applied by the tensioner to the multifilament is 0.05-0.15 N.

The present invention also provides the said application of the composite interlaced yarn, wherein the composite interlaced yarn is used as a warp yarn to make a fabric.

Since the interlacing fastness of the interlacing part I and the interlacing part II in the composite interlaced yarn is different, the composite interlaced yarn of the present invention is used as the warp yarn; under the same weaving process, the interlacing part II are more likely to loosen by the repeated friction of the steel buckle and the heald frame than the interlacing part I, therefore, the fabric surface obtained shows the characteristics of a single warp yarn being tight in one section and fluffy in another section, which reflect light differently, so the thickness of the warp yarn on the fabric surface is randomly distributed and uneven in appearance, but the fabric surface is physically flat, only the appearance shows unevenness, which can be used in the field of clothing, decorative and other fabric fields.

Benefits:

Compared with the existing interlacing technology of filaments, the interlacing method for the composite filament of the invention broadens the application range of the interlacing technology; the existing interlacing technology of filaments mainly uses the interlacing method to make the filaments untwist and sizing-free during weaving, the interlacing technology of the invention not only has this function, but also takes advantage of the fact that the two interlacing knots have different interlacing fastnesses, the interlacing knots with low interlacing fastness is easy to loosen during weaving, and the interlacing knot with high interlacing fastness is not easy to loosen during weaving, so that when the multifilament after interlacing is used as the warp yarn for weaving, the gloss and visual flatness of the cloth surface have different styles compared with the existing interlacing multifilaments.

wherein the numbers in the figures are respectively represented: 1—fine denier DTY multifilament, 2—splitting part I, 3—interlacing part I, 4—splitting part II, 5—interlacing part II, 6—tensioner, 7—jet, 8—winding roller, 9—yarn path, 10—jet hole I, and 11—jet hole II.

DETAILED DESCRIPTION OF THE EMBODIMENTS

Based on above mentioned method, the following embodiments are carried out for further demonstration in the present invention. It is to be understood that these embodiments are only intended to illustrate the invention and are not intended to limit the scope of the invention. In addition, it should be understood that after reading the contents described in the present invention, those technical personnel in this field can make various changes or modifications to the invention, and these equivalent forms also fall within the scope of the claims attached to the application.

Example 1

Figure 3:
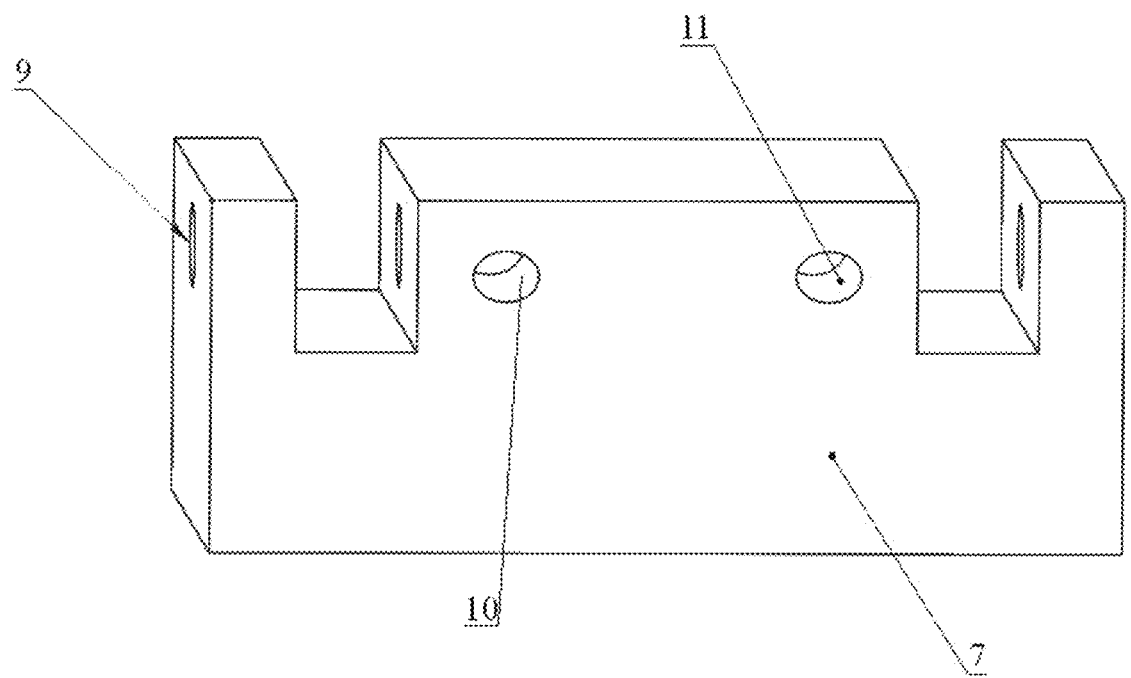
FIG. 3 is a three-dimensional structural diagram of the jet in the invention.

A jet for a composite interlaced yarn, wherein the structure is as follows:

as shown in FIG. 3, wherein the jet is formed by processing a cubic structure (the material is generally metal), the cube has surfaces a and a' parallel to each other, surfaces b and b' parallel to each other, and surfaces c and c' parallel to each other; open grooves w and v penetrating surfaces b and b' on surface c; open through-holes extending to surface a' on surface a, the through-hole passing through grooves w and v and serving as the yarn path 9 (the aperture of the yarn path is 2.5-3 mm) of the jet; open holes x and y connected to the through-hole on surface b or b', connection surfaces of holes x and y with the through-hole completely falling into a side wall of the through-holes (not penetrating the cube, and lying between grooves w and v); the hole x serving as the jet hole I 10 of the jet, the hole y serving as the jet hole II 11 of the jet; the jet hole I and the jet hole II are located on the same side of the jet, central axes of the jet hole I and the jet hole II are both perpendicular to the central axis of the yarn path, and structures of the jet hole I and the jet hole II are the same (the apertures are both 1-1.5 mm); the distance between a center point of the connection surface of the hole x with the through-hole and a center point of the connection surface of the hole y with the through-hole is 5-10 mm.

Example 2

Figure 1:
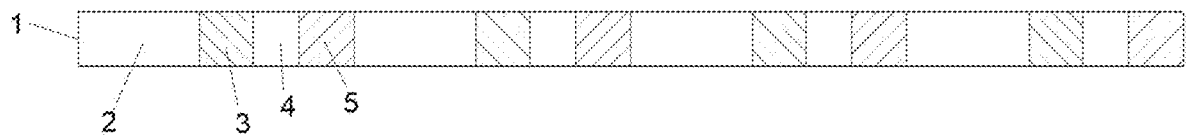
FIG. 1 is a structural diagram of the composite interlaced yarn in the invention.
Figure 2:
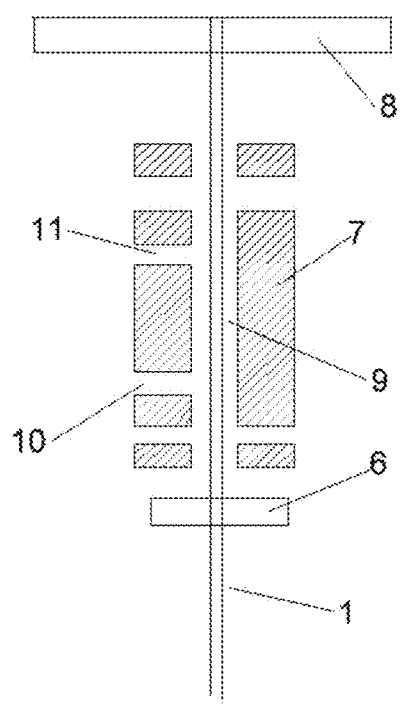
FIG. 2 is a schematic diagram of the production process of the composite interlaced yarn in the invention.

A method for interlacing a composite interlaced yarn is as follows:
in the processing of a fine denier DTY multifilament with a specification of 3 tex/10 F, as shown in FIG. 2, after the multifilament passes through the tensioner 6 with the pre-tension of 0.05 N, it passes through the yarn path 9 of the jet 7, and is wound by the winding roller 8 to obtain the composite interlaced yarn 1;
wherein the structure of the jet is the structure in Example 1, the distance between the center point of the connection surface of the hole x with the through-hole and the center point of the connection surface of the hole y with the through-hole is 5 mm; the diameter of the hole x and the hole y is 1 mm; the diameter of the yarn path is 2.5 mm; when the multifilament A passing through the yarn path of the jet, the jet hole I and the jet hole II intermittently inject the compressed airflow into the yarn path (that is, in the yarn path, the multifilament is firstly subjected to the interlacing effect of the airflow injected by the jet hole I, and then to the interlacing effect of the airflow injected by the jet hole II), after the jet hole I finishes injecting airflow for a certain interval time T1, the jet hole II injects the airflow, and after the jet hole II finishes injecting airflow for a certain interval time T2, the jet hole I injects the airflow again; a time for a single airflow injection by the jet hole I and the jet hole II is the same, T1 and T2 are the same; the time for the single airflow injection by the jet hole I and the jet hole II is 0.1 ms, and T1 and T2 are both 0.233 ms; the pressure of the compressed airflow injected into the jet hole I is 0.2 MPa, and the pressure of the compressed airflow injected into the jet hole II is 0.05 MPa; the linear velocity of the winding roller is 30 m/s;
the prepared composite interlaced yarn 1 includes a plurality of continuous circulation units in a longitudinal length; as shown in FIG. 1, each circulation unit includes a splitting part I 2, an interlacing part I 3, a splitting part II 4 and an interlacing part II 5 connected in sequence; the length of the splitting part I is 3 mm, the length of the interlacing part I is 7 mm, the length of the splitting part II is 3 mm, and the length of the interlacing part II is 7 mm; the interlacing degree of the interlacing part I is 50, and the interlacing degree of the interlacing part II is 50; the interlacing fastness of the interlacing part I is 85%, and the interlacing fastness of the interlacing part II is 40%;
the composite interlaced yarn is used as the warp yarn, and the fabric surface obtained shows the characteristics of a single warp yarn being tight in one section and fluffy in another section, which reflect light differently, so the thickness of the warp yarn on the fabric surface is randomly distributed and uneven in appearance.

Example 3

A method for interlacing a composite interlaced yarn is as follows:
in the processing of a fine denier DTY multifilament with a specification of 5 tex/15 F, as shown in FIG. 2, after the multifilament passes through the tensioner 6 with the pre-tension of 0.08 N, it passes through the yarn path 9 of the jet, and is wound by the winding roller 8 to obtain the composite interlaced yarn 1;
wherein the structure of the jet is the structure in Example 1, the distance between the center point of the connection surface of the hole x with the through-hole and the center point of the connection surface of the hole y with the through-hole is 7 mm; the diameter of the hole x and the hole y is 1.1 mm; the diameter of the yarn path is 2.7 mm; when the multifilament A passing through the yarn path of the jet, the jet hole I and the jet hole II intermittently inject the compressed airflow into the yarn path (that is, in the yarn path, the multifilament is firstly subjected to the interlacing effect of the airflow injected by the jet hole I, and then to the interlacing effect of the airflow injected by the jet hole II), after the jet hole I finishes injecting airflow for a certain interval time T1, the jet hole II injects the airflow, and after the jet hole II finishes injecting airflow for a certain interval time T2, the jet hole I injects the airflow again; a time for a single airflow injection by the jet hole I and the jet hole II is the same, T1 and T2 are the same; the time for the single airflow injection by the jet hole I and the jet hole II is 0.125 ms, and T1 and T2 are both 0.225 ms; the pressure of the compressed airflow injected into the jet hole I is 0.22 MPa, and the pressure of the compressed airflow injected into the jet hole II is 0.07 MPa; the linear velocity of the winding roller is 40 m/s;
the prepared composite interlaced yarn includes a plurality of continuous circulation units in a longitudinal length; as shown in FIG. 1, each circulation unit includes a splitting part I 2, an interlacing part I 3, a splitting part II 4 and an interlacing part II 5 connected in sequence; the length of the splitting part I is 5 mm, the length of the interlacing part I is 9 mm, the length of the splitting part II is 5 mm, and the length of the interlacing part II is 9 mm; the interlacing degree of the interlacing part I is 36, and the interlacing degree of the interlacing part II is 36; the interlacing fastness of the interlacing part I is 88%, and the interlacing fastness of the interlacing part II is 44%;
the composite interlaced yarn is used as the warp yarn, and the fabric surface obtained shows the characteristics of a single warp yarn being tight in one section and fluffy in another section, which reflect light differently, so the thickness of the warp yarn on the fabric surface is randomly distributed and uneven in appearance.

Example 4

A method for interlacing a composite interlaced yarn is as follows:
in the processing of a fine denier DTY multifilament with a specification of 8 tex/22 F, as shown in FIG. 2, after the multifilament passes through the tensioner 6 with the pre-tension of 0.1 N, it passes through the yarn path 9 of the jet, and is wound by the winding roller 8 to obtain the composite interlaced yarn 1;
wherein the structure of the jet is the structure in Example 1, the distance between the center point of the connection surface of the hole x with the through-hole and the center point of the connection surface of the hole y with the through-hole is 8 mm; the diameter of the hole x and the hole y is 1.2 mm; the diameter of the yarn path is 2.8 mm; when the multifilament A passing through the yarn path of the jet, the jet hole I and the jet hole II intermittently inject the compressed airflow into the yarn path (that is, in the yarn path, the multifilament is firstly subjected to the interlacing effect of the airflow injected by the jet hole I, and then to the interlacing effect of the airflow injected by the jet hole II), after the jet hole I finishes injecting airflow for a certain interval time T1, the jet hole II injects the airflow, and after the jet hole II finishes injecting airflow for a certain interval time T2, the jet hole I injects the airflow again; a time for a single airflow injection by the jet hole I and the jet hole II is the same, T1 and T2 are the same; the time for the single airflow injection by the jet hole I and the jet hole II is 0.2 ms, and T1 and T2 are both 0.286 ms; the pressure of the compressed airflow injected into the jet hole I is 0.25 MPa, and the pressure of the compressed airflow injected into the jet hole II is 0.08 MPa; the linear velocity of the winding roller is 35 m/s;

the prepared composite interlaced yarn includes a plurality of continuous circulation units in a longitudinal length; as shown in FIG. 1, each circulation unit includes a splitting part I 2, an interlacing part I 3, a splitting part II 4 and an interlacing part II 5 connected in sequence; the length of the splitting part I is 7 mm, the length of the interlacing part I is 10 mm, the length of the splitting part II is 7 mm, and the length of the interlacing part II is 10 mm; the interlacing degree of the interlacing part I is 30, and the interlacing degree of the interlacing part II is 30; the interlacing fastness of the interlacing part I is 90%, and the interlacing fastness of the interlacing part II is 50%;

the composite interlaced yarn is used as the warp yarn, and the fabric surface obtained shows the characteristics of a single warp yarn being tight in one section and fluffy in another section, which reflect light differently, so the thickness of the warp yarn on the fabric surface is randomly distributed and uneven in appearance.

Example 5

A method for interlacing a composite interlaced yarn is as follows:
in the processing of a fine denier DTY multifilament with a specification of 12 tex/30 F, as shown in FIG. 2, after the multifilament passes through the tensioner 6 with the pre-tension of 0.12 N, it passes through the yarn path 9 of the jet, and is wound by the winding roller 8 to obtain the composite interlaced yarn 1;
wherein the structure of the jet is the structure in Example 1, the distance between the center point of the connection surface of the hole x with the through-hole and the center point of the connection surface of the hole y with the through-hole is 9 mm; the diameter of the hole x and the hole y is 1.4 mm; the diameter of the yarn path is 3 mm; when the multifilament A passing through the yarn path of the jet, the jet hole I and the jet hole II intermittently inject the compressed airflow into the yarn path (that is, in the yarn path, the multifilament is firstly subjected to the interlacing effect of the airflow injected by the jet hole I, and then to the interlacing effect of the airflow injected by the jet hole II), after the jet hole I finishes injecting airflow for a certain interval time T1, the jet hole II injects the airflow, and after the jet hole II finishes injecting airflow for a certain interval time T2, the jet hole I injects the airflow again; a time for a single airflow injection by the jet hole I and the jet hole II is the same, T1 and T2 are the same; the time for the single airflow injection by the jet hole I and the jet hole II is 0.188 ms, and T1 and T2 are both 0.25 ms; the pressure of the compressed airflow injected into the jet hole I is 0.28 MPa, and the pressure of the compressed airflow injected into the jet hole II is 0.09 MPa; the linear velocity of the winding roller is 48 m/s;

the prepared composite interlaced yarn includes a plurality of continuous circulation units in a longitudinal length; as shown in FIG. 1, each circulation unit includes a splitting part I 2, an interlacing part I 3, a splitting part II 4 and an interlacing part II 5 connected in sequence; the length of the splitting part I is 9 mm, the length of the interlacing part I is 12 mm, the length of the splitting part II is 9 mm, and the length of the interlacing part II is 12 mm; the interlacing degree of the interlacing part I is 24, and the interlacing degree of the interlacing part II is 24; the interlacing fastness of the interlacing part I is 93%, and the interlacing fastness of the interlacing part II is 55%;

the composite interlaced yarn is used as the warp yarn, and the fabric surface obtained shows the characteristics of a single warp yarn being tight in one section and fluffy in another section, which reflect light differently, so the thickness of the warp yarn on the fabric surface is randomly distributed and uneven in appearance.

Example 6

A method for interlacing a composite interlaced yarn is as follows:
in the processing of a fine denier DTY multifilament with a specification of 15 tex/40 F, as shown in FIG. 2, after the multifilament passes through the tensioner 6 with the pre-tension of 0.15 N, it passes through the yarn path 9 of the jet, and is wound by the winding roller 8 to obtain the composite interlaced yarn 1;
wherein the structure of the jet is the structure in Example 1, the distance between the center point of the connection surface of the hole x with the through-hole and the center point of the connection surface of the hole y with the through-hole is 10 mm; the diameter of the hole x and the hole y is 1.5 mm; the diameter of the yarn path is 3 mm; when the multifilament A passing through the yarn path of the jet, the jet hole I and the jet hole II intermittently inject the compressed airflow into the yarn path (that is, in the yarn path, the multifilament is firstly subjected to the interlacing effect of the airflow injected by the jet hole I, and then to the interlacing effect of the airflow injected by the jet hole II), after the jet hole I finishes injecting airflow for a certain interval time T1, the jet hole II injects the airflow, and after the jet hole II finishes injecting airflow for a certain interval time T2, the jet hole I injects the airflow again; a time for a single airflow injection by the jet hole I and the jet hole II is the same, T1 and T2 are the same; the time for the single airflow injection by the jet hole I and the jet hole II is 0.2 ms, and T1 and T2 are both 0.3 ms; the pressure of the compressed airflow injected into the jet hole I is 0.3 MPa, and the pressure of the compressed airflow injected into the jet hole II is 0.1 MPa; the linear velocity of the winding roller is 50 m/s;

the prepared composite interlaced yarn includes a plurality of continuous circulation units in a longitudinal length; as shown in FIG. 1, each circulation unit includes a splitting part I 2, an interlacing part I 3, a splitting part II 4 and an interlacing part II 5 connected in sequence; the length of the splitting part I is 10 mm, the length of the interlacing part I is 15 mm, the length of the splitting part II is 10 mm, and the length of the interlacing part II is 15 mm; the interlacing degree of the interlacing part I is 20, and the interlacing degree of the interlacing part II is 20; the interlacing fastness of the interlacing part I is 95%, and the interlacing fastness of the interlacing part II is 60%;

the composite interlaced yarn is used as the warp yarn, and the fabric surface obtained shows the characteristics of a single warp yarn being tight in one section and fluffy in another section, which reflect light differently, so the thickness of the warp yarn on the fabric surface is randomly distributed and uneven in appearance.

What is claimed is:

1. A composite interlaced yarn, being a filament subjected to an interlacing process, wherein the filament is a multifilament, wherein the composite interlaced yarn comprises a plurality of continuous circulation units in a longitudinal length;

wherein each circulation unit of the plurality of continuous circulation units comprises a first splitting part, a first interlacing part, a second splitting part and a second interlacing part connected in sequence;

wherein an interlacing fastness of the first interlacing part is different from an interlacing fastness of the second interlacing part;

wherein the interlacing fastness of the first interlacing part is 85%-95%, and the interlacing fastness of the second interlacing part is 40%-60%;

wherein the composite interlaced yarn is obtained by the multifilament that is not subjected to the interlacing process sequentially adjusting a pre-tension by a tensioner, passing through a yarn path of a jet, and winding by a winding roller;

wherein the jet is formed by processing a cubic structure, wherein a cube of the cubic structure has surfaces a and a' parallel to each other, surfaces b and b' parallel to each other, and surfaces c and c' parallel to each other; wherein the processing is to open grooves w and v penetrating the surfaces b and b' on the surface c, open through-holes extending to the surface a' on the surface a, the through-hole passing through the grooves w and v and serving as the yarn path of the jet, and open holes x and y connected to the through-hole on the surface b or b', connection surfaces of the holes x and y with the through-hole completely falling into a side wall of the through-holes, the hole x serving as a first jet hole of the jet, the hole y serving as a second jet hole of the jet, and a distance between a center point of the connection surface of the hole x with the through-hole and a center point of the connection surface of the hole y with the through-hole is 5 mm-10 mm;

when the multifilament passes through the yarn path of the jet, the first jet hole and the second jet hole intermittently inject a compressed airflow into the yarn path, after the first jet hole finishes injecting airflow for a first interval time T1, the second jet hole injects the airflow, and after the second jet hole finishes injecting airflow for a second interval time T2, the first jet hole injects the airflow again; a time for a single airflow injection by the first jet hole and the second jet hole is same, T1 and T2 are same, a linear velocity of the winding roller is 30 m/s-50 m/s, and a pressure of injecting the compressed airflow into the yarn path by the first jet hole is greater than a pressure of injecting the compressed airflow into the yarn path by the second jet hole; and wherein the composite interlaced yarn is used as a warp yarn to make a fabric, and a fabric surface obtained shows characteristics of a single warp yarn being tight in one section and fluffy in another section, reflecting light differently, so a thickness of the warp yarn on the fabric surface is randomly distributed and uneven in appearance, wherein the time for the single airflow injection by the first jet hole and the second jet hole is 0.1 ms-0.2 ms, and T1 and T2 are both 0.225 ms-0.3 ms, and wherein a pressure of the compressed airflow injected into the first jet hole is 0.2 MPa-0.3 MPa, and a pressure of the compressed airflow injected into the second jet hole is 0.05 MPa-0.1 MPa.

2. The composite interlaced yarn of claim 1, wherein an interlacing degree of the first interlacing part is 20-50, and an interlacing degree of the second interlacing part is 20-50.

3. The composite interlaced yarn of claim 1, wherein the filament is a fine denier draw texturing yarn (DTY) multifilament, and a specification of the fine denier DTY multifilament is 3 tex-15 tex/10 F-40 F.

4. The composite interlaced yarn of claim 1, wherein central axes of the first jet hole and the second jet hole are both perpendicular to a central axis of the yarn path, and structures of the first jet hole and the second jet hole are same.

5. The composite interlaced yarn of claim 1, wherein the pre-tension applied by the tensioner to the multifilament is 0.05 N-0.15 N.

* * * * *